United States Patent
Dee et al.

(10) Patent No.: US 11,738,856 B2
(45) Date of Patent: Aug. 29, 2023

(54) CONTROL SYSTEMS AND METHODS

(71) Applicant: BAE SYSTEMS plc, London (GB)

(72) Inventors: Justin Mark Dee, Rochester (GB); Jason Howard Bean, Rochester (GB)

(73) Assignee: BAE SYSTEMS PLC, London (GB)

(*) Notice: Subject to any disclaimer, the term of this patent is extended or adjusted under 35 U.S.C. 154(b) by 1358 days.

(21) Appl. No.: 16/092,900

(22) PCT Filed: Mar. 28, 2017

(86) PCT No.: PCT/GB2017/050861
§ 371 (c)(1),
(2) Date: Oct. 11, 2018

(87) PCT Pub. No.: WO2017/178789
PCT Pub. Date: Oct. 19, 2017

(65) Prior Publication Data
US 2020/0198767 A1    Jun. 25, 2020

(30) Foreign Application Priority Data

Apr. 11, 2016 (GB) .................................... 1606074

(51) Int. Cl.
*B64C 13/12* (2006.01)
*B64C 13/04* (2006.01)
(Continued)

(52) U.S. Cl.
CPC .......... *B64C 13/12* (2013.01); *B64C 13/0421* (2018.01); *B64C 13/10* (2013.01); *G05G 5/03* (2013.01); *G05G 9/047* (2013.01)

(58) Field of Classification Search
CPC ................................ B64C 13/12; B64C 13/10
See application file for complete search history.

(56) References Cited

U.S. PATENT DOCUMENTS

| 5,446,666 A | 8/1995 | Bauer |
| 2004/0159100 A1 | 8/2004 | Bernard |

(Continued)

FOREIGN PATENT DOCUMENTS

| GB | 2427906 A | 1/2007 |
| GB | 2482409 A | 2/2012 |

(Continued)

OTHER PUBLICATIONS

GB Search Report under Section 17(5) received for GB Application No. 1606077.4, dated Oct. 12, 2016. 4 pages.

(Continued)

*Primary Examiner* — Vicky A Johnson
(74) *Attorney, Agent, or Firm* — Finch & Maloney PLLC

(57) ABSTRACT

A control system for electronically linked pilot and co-pilot inceptors (103) permits an asymmetric roll axis feel depending on whether an inceptor is moved inboard or outboard. A circuit (401) receives a signal representative of a force applied to the pilot's inceptor resulting from a side-to-side movement and detects if the force applied is in an inward or an outward direction. A gain factor is applied to the received force signal to produce a factored force signal. The gain applied to a signal representative of force applied in an outward direction is greater than the gain factor applied to a signal representative of force applied in an inward direction. A summer (212, 213) sums the factored force signal with a corresponding factored force signal derived from force signals from the co-pilot's inceptor to produce a modified force signal for use in a force feedback control system associated with each inceptor.

20 Claims, 4 Drawing Sheets

(51) Int. Cl.
    *B64C 13/10*     (2006.01)
    *G05G 9/047*     (2006.01)
    *G05G 5/03*     (2008.04)

(56) References Cited

U.S. PATENT DOCUMENTS

| | | | |
|---|---|---|---|
| 2005/0173595 A1 | 8/2005 | Hoh | |
| 2009/0187292 A1 | 7/2009 | Hreha et al. | |
| 2012/0053735 A1* | 3/2012 | Tessier | B64C 13/503 700/275 |
| 2014/0021303 A1* | 1/2014 | Salamat | F16H 57/08 244/231 |

FOREIGN PATENT DOCUMENTS

| | | |
|---|---|---|
| JP | H0191890 A | 4/1989 |
| WO | 2015/066219 A1 | 5/2015 |
| WO | 2017/178789 A2 | 10/2017 |
| WO | 2017/178791 A2 | 10/2017 |

OTHER PUBLICATIONS

International Search Report and Written Opinion received for PCT Application No. PCT/GB2017/050863, dated Mar. 29, 2018. 13 pages.
International Preliminary Report on Patentability received for PCT Application No. PCT/GB2017/050861, dated Oct. 25, 2018. 8 pages.
International Preliminary Report on Patentability received for PCT Application No. PCT/GB2017/050863, dated Oct. 25, 2018. 17 pages.
GB Search Report under Section 17(5) received for GB Application No. 1606074.1, dated Oct. 12, 2016. 3 pages.
International Search Report and Written Opinion received for PCT Application No. PCT/GB2017/050861, dated Dec. 1, 2017. 12 pages.
Astrom, K.J. and Murray, R.M., "Feedback Systems, An Introduction for Scientists and Engineers," Chapter Two, System Modeling, v2.10c—Princeton University Press, 2008. 48 pages.

\* cited by examiner

CONTROL SYSTEMS AND METHODS

This invention relates to control systems and is particularly, though not exclusively, applicable to controls sticks (often referred to as 'inceptors') for aircraft, fixed wing or rotary wing.

A typical inceptor is used by a pilot to control pitch and roll of an aircraft and is often used as part of a fly by wire system. The inceptor may move in two axes with fore and aft movements controlling pitch of the aircraft and side to side movements controlling roll of the aircraft. In contrast to the classical control stick designs, in which the forces which act on the aircraft during the flight are transmitted to the control stick in the form of resistance and deflection, there is no such feedback in conventional fly-by-wire systems. Modern, passive inceptors have a fixed force feel characteristic provided by springs and dampers. Current active inceptors are provided with control systems which rely on a servo actuator mechanism incorporating force and position sensors and drive motors to permit the force feel characteristic of the inceptor to be modified continuously throughout flight.

It is known to electronically link two active inceptors together in aircraft having dual seat pilot/co-pilot cockpit configurations whereby the pilot and co-pilot can make inputs to their respective inceptors individually or simultaneously and also whereby the pilot can feel the co-pilot's input force and vice versa. In such a configuration, there may also be a requirement for providing asymmetric roll axis forces; that is, between inboard and outboard movements of an inceptor. Because of the particular physiology of the human arm, a pilot/co-pilot tends to find it easier to move an inceptor inboard rather than outboard. It would be advantageous to provide a means for incorporating an asymmetric roll force response into a linked dual-inceptor system.

According to a first aspect of the invention, there is provided a control system for controlling manually-operated first and second control sticks, the control system including: a first circuit arrangement for receiving force signals representative of a force applied to each control stick resulting from a side to side movement of a control stick and arranged to detect if said force applied is in an inward direction towards the operator or an outward direction away from the operator and to apply a gain factor to each received force signal to produce factored force signals wherein the gain factor applied to a received force signal representative of a force applied in an outward direction is greater than the gain factor applied to a received force signal representative of a force applied in an inward direction; and a second circuit arranged to sum the factored force signals to produce a modified force signal for use in a force feedback control system associated with each control stick.

In one embodiment, the gain factor applied to a received force signal representative of a force applied in an outward direction is greater than 1 and the gain factor applied to a received force signal representative of a force applied in an inward direction is equal to 1.

In an alternative embodiment, the gain factor applied to a received force signal representative of a force applied in an outward direction is equal to 1 and the gain factor applied to a received force signal representative of a force applied in an inward direction is less than 1.

Preferably, a ratio of the gain factor applied to a received force signal representative of a force applied to the first stick in an outward direction to the gain factor applied to a received force signal representative of a force applied to the first stick in an inward direction has the same value as a ratio of the gain factor applied to a received force signal representative of a force applied to the second stick in an outward direction to the gain factor applied to a received for signal representative of a force applied to the second stick in an inward direction.

The control system may further include first and second force feedback control systems associated, respectively, with the first and second control sticks and arranged to receive the modified force signal. Each of said first and second force feedback control systems may be configured as a second order Mass Spring Damper (MSD) system. The MSD systems may include, respectively, first and second gradient force gain circuits containing identical mappings of force-displacement characteristics. Optimally, the force-displacement characteristics in a leftward direction of movement for both control sticks are identical. Likewise, the force-displacement characteristics in a rightward direction of movement for both control sticks are also identical. However, the rightward and leftward force-displacement characteristics can be different.

According to a second aspect of the invention, there is provided a method for controlling first and second manually-operated control sticks the method including: receiving force signals representative of a force applied to each control stick resulting from a side to side movement of a control stick; detecting if said force applied is in an inward direction towards the operator or an outward direction away from the operator; applying a gain factor to each received force signal to produce factored force signals wherein the gain factor applied to a received force signal representative of a force applied in an outward direction is greater than the gain factor applied to a received force signal representative of a force applied in an inward direction; and summing the factored force signals to produce a modified force signal for use in a force feedback control system associated with each control stick.

According to a third aspect of the invention, there is provided a tangible computer program product having an executable computer program code stored thereon for execution by a processor to perform methods in accordance with the invention.

The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

Other aspects of the invention comprise an inceptor system including linked control sticks and a control system in accordance with the first aspect and an aircraft incorporating such an inceptor system.

These and other aspects, features and advantages of the invention will be apparent from, and elucidated with reference to, the embodiments described hereinafter.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 1:
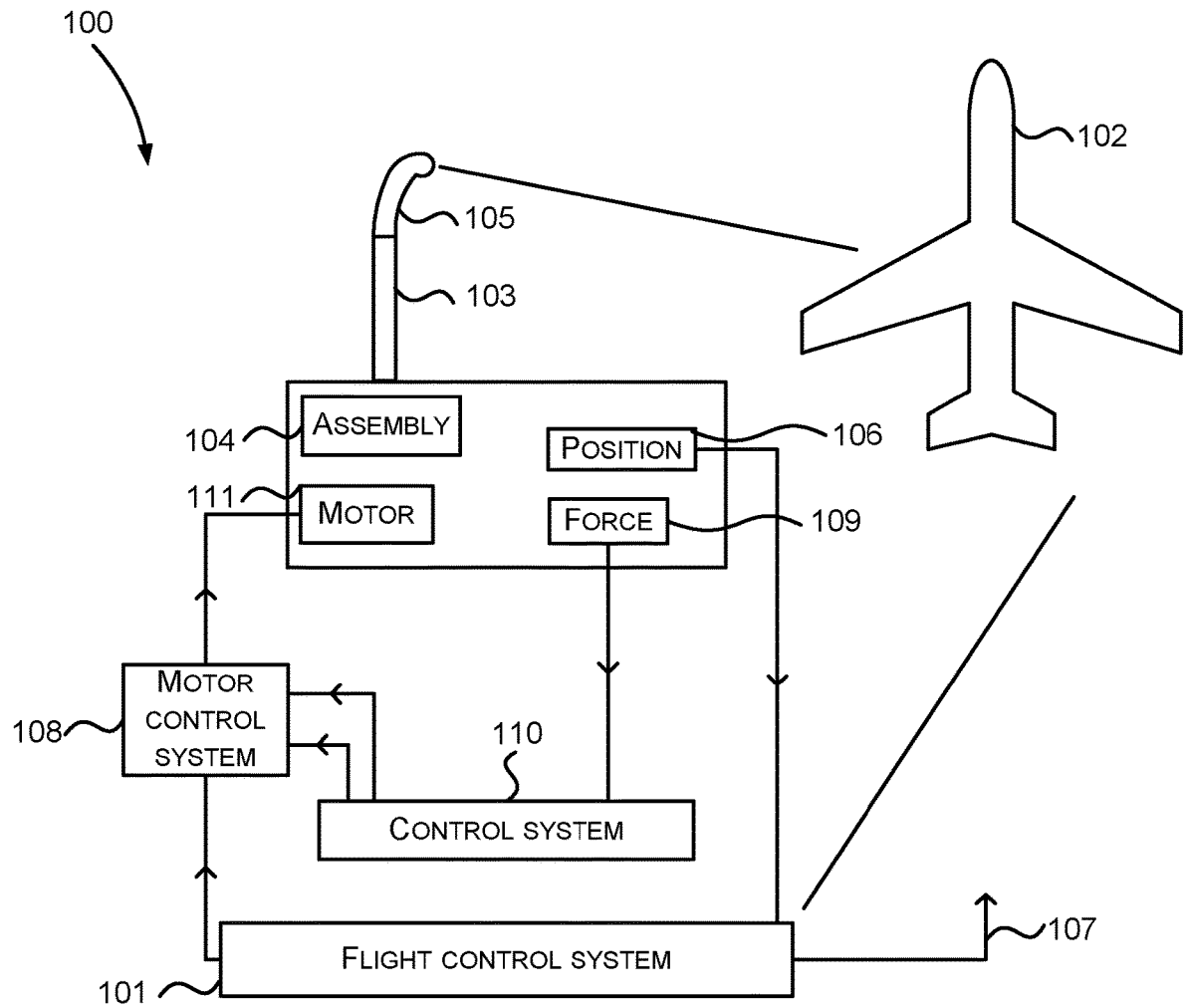
FIG. 1 is a simplified, schematic block diagram showing an example of an inceptor system.

FIG. 1 shows a schematic block diagram of an active inceptor system 100 which is coupled to a flight control system 101, both systems being incorporated in an aircraft 102. An inceptor 103 is coupled to a suitable two degree of freedom assembly 104 that permits the inceptor 103 to be moved in fore and aft and side to side directions. Conventionally, fore and aft movements of the inceptor 103 control pitch of the aircraft and side to side movements of the inceptor control roll of the aircraft. The inceptor 103 includes a manual grip 105.

As is conventional, the inceptor system 100 may supply signals representative of aircraft pitch and roll commands to the flight control system 101. Such aircraft commands may be derived using suitable devices and techniques. Generally, such commands are related to the angular position of the inceptor 103. In the example of FIG. 1, a position sensor assembly 106 is coupled to the inceptor 103 and detects angular displacement of the inceptor 103 in both fore and aft and side to side directions. The position sensor assembly 106 supplies signals to the flight control system 101 which in turn provides control signals on output line 107 to actuators controlling the flying surfaces of the aircraft 102 and also supplies a position signal to a motor control system 108.

A force sensor 109 is also provided and coupled to the inceptor 103 for sensing an input force applied to the inceptor 103 by the pilot. An output from the force sensor is supplied to a control system 110. The control system 110 outputs position and velocity signals (derived from signals provided by the force sensor 109) to the motor control system 108. The motor control system 108 outputs a drive signal to a motor 111 which is coupled to the inceptor 103. The control system 110 and the motor control system 108 coupled thereto serve to drive the motor 111 so that the inceptor 103 is moved (by the motor) to a desired position which depends upon the force exerted on the inceptor 103 by an operator. Thus, the action of the motor also provides a force feel characteristic to the operator (pilot). The control system 110 may be configured to simulate a second order Mass-Spring-Damper (MSD) system. Such MSD systems are known and described in the literature. See for example http://www.cds.caltech.edu/~murray/books/AM08/pdf/am08-modeling 19 Jul. 2011.pdf.

A typical aircraft may include two such inceptor systems, one operable by the pilot and the other operable by the co-pilot, each inceptor system being coupled to the flight control system 101. For example, two active inceptors may be utilised as side-mounted controls in aircraft with dual seat pilot/co-pilot cockpit configurations whereby the pilot and co-pilot can make inputs to their respective inceptors individually or simultaneously. In order to simulate a mechanical linkage (so that when one inceptor is moved, the other moves in the same manner), the two inceptors can be electronically linked to allow the pilot to feel the co-pilot's input force and vice versa. This can be done by transmitting a pilot-applied force to the co-pilot's inceptor over a digital communication link and summing this applied force with the sensed co-pilot's applied force (and vice versa).

Figure 2:
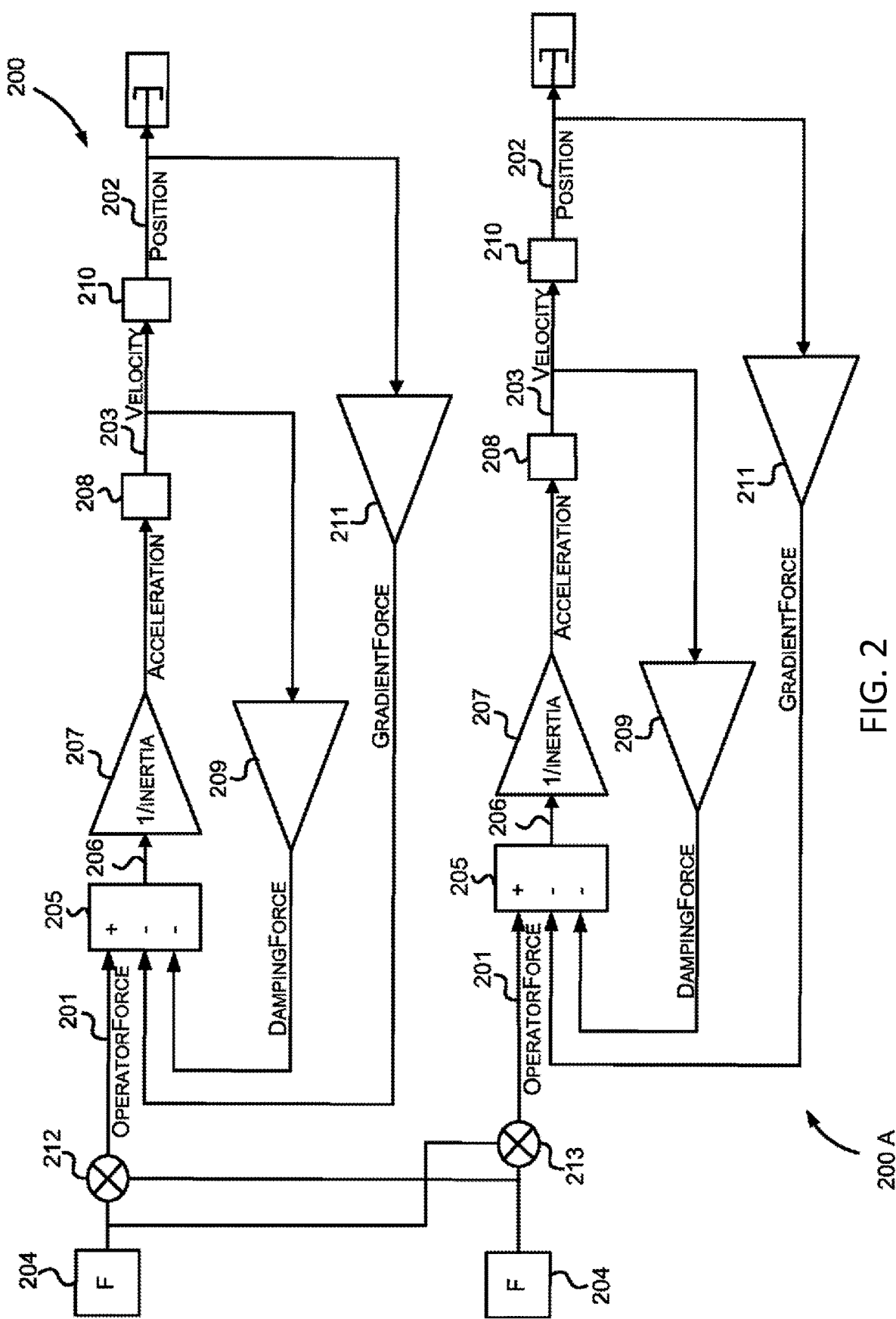
FIG. 2 is a simplified schematic block diagram of a first example of first and second control systems for controlling operation of a pilot-operated inceptor and a co-pilot operated inceptor respectively.

FIG. 2 is a simplified block diagram illustrating components of two control systems 200, 200A each configured as second order MSD systems for reacting to side to side movements (roll) of an inceptor operated by a pilot and a co-pilot respectively. Each control system 200, 200A of FIG. 2 uses three MSD function parameters, that is; inertia, damping and gradient to provide a model position output signal. Each control system 200, 200A uses an input signal (on line 201), representative of the sum of the forces (applied by the pilot and/or co-pilot to their respective inceptors) to generate a feedback 'position' signal (or 'model position') on output lines 202, 202' and also a velocity signal on line 203, both of which may be used by the motor control system 108 (along with a position input from the flight control system 101) to generate a demand signal for driving the motor 111 (and therefore the inceptors) to a desired position which depends on the force being applied. Box 204 represents a force applied to an inceptor by the operator.

A signal representing force applied is input into a first summing circuit 205. Two other inputs are also received by the first summing circuit 205. These two other inputs are actually subtracted from the force input to provide an output signal on line 206 which is fed into an input of a (1/inertia) gain circuit 207. The (1/inertia) gain circuit 207 operates in a conventional manner and outputs a signal representing an acceleration of the inceptor 103. An output of the (1/inertia) gain circuit 207 is then fed through a first integrator 208 which outputs a signal on line 203 representing a velocity. The velocity signal is fed through a damping force gain circuit 209 whose output is fed to the first summing circuit 205. The velocity signal is also fed to a second integrator 210 which outputs a signal on line 202 representing a position. The output of the second integrator 210 provides the output of the control system 200 on line 202, 202' and is also fed to a gradient force gain circuit 211 whose output is fed into the first summing circuit 204.

A gradient force gain circuit 211 is configured to calculate a gradient force according to a complex series of co-ordinates which define a predetermined mapping characteristic from position (that is; inceptor angular displacement) to force. This force-displacement characteristic may be predetermined by the flight control system 101 and determines the "feel" to the operator as he operates the inceptor 103. The co-ordinates 302 may be stored in a lookup table incorporated in the gradient force gain circuit 211 Thus, the gradient force gain circuit 211 takes a position output from the output of the second integrator 210, passes the position through the look up table of coordinates and outputs the corresponding force into the first summing circuit 205.

The first summing circuit 205, first integrator 208, second integrator 210, damping force gain circuit 209 and gradient force gain control circuit 211 behave as a second order MSD system. The motor control system 108 will drive an inceptor to a desired position depending on the force applied and if both the pilot and co-pilot should release the force on their inceptors so that the contribution of the input signal on line 201 to the summed forces in the summer 205 is zero, then the motor will drive the inceptors back to a null position. The two second order MSD systems 200, 200A are linked by way of second and third summing circuits 212, 213. The second summing circuit 212 adds co-pilot applied force to pilot applied force and applies the sum to the first summing circuit 205 of the second order MSD system 200. The third summing circuit 213 adds the pilot applied force to the co-pilot applied force and applies the sum to the first summing circuit 205 of the second order control system 200A. The signal on line 202 is used to generate a control signal for driving the pilot's inceptor and the signal on line 202' is used to generate a control signal for driving the co-pilot's inceptor.

In some inceptor systems, there may be a requirement for providing asymmetric roll axis forces; that is, between inboard and outboard movements. Because of the particular physiology of the human arm, an operator finds it easier to move an inceptor inboard rather than outboard. An inceptor control system can be configured to simulate a greater resistance to an inboard movement than to an outboard movement so that the operator perceives that he is using the same force in each direction. This can be achieved by the use of an asymmetric force-displacement characteristic in the gradient gain force circuit 211 so that a greater inward force compared with outward force has to be applied in order to achieve the same amplitude of displacement. However, as for example, a roll input to the left is an outboard movement for the pilot but an inboard movement for the co-pilot, the force-displacement characteristics in the gradient force gain circuits 211 of second order MSD control systems 200 and 200A would have to be different. If there is also a requirement for the pilot's and co-pilot's inceptors to be electronically linked, then the linking arrangement of FIG. 2 cannot be used because such an arrangement cannot maintain linking whilst at the same time provide different feedback forces to the pilot and co-pilot. The present invention provides a solution for overcoming this problem.

Figure 3:
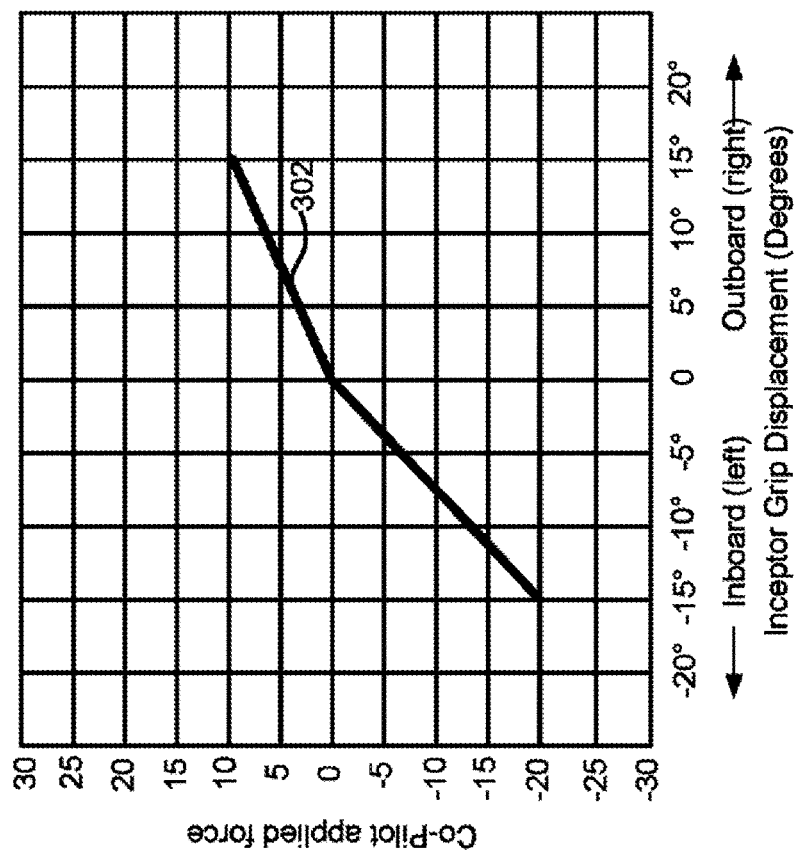
FIG. 3 shows graphs of asymmetric roll axis gradients.
Figure 3:
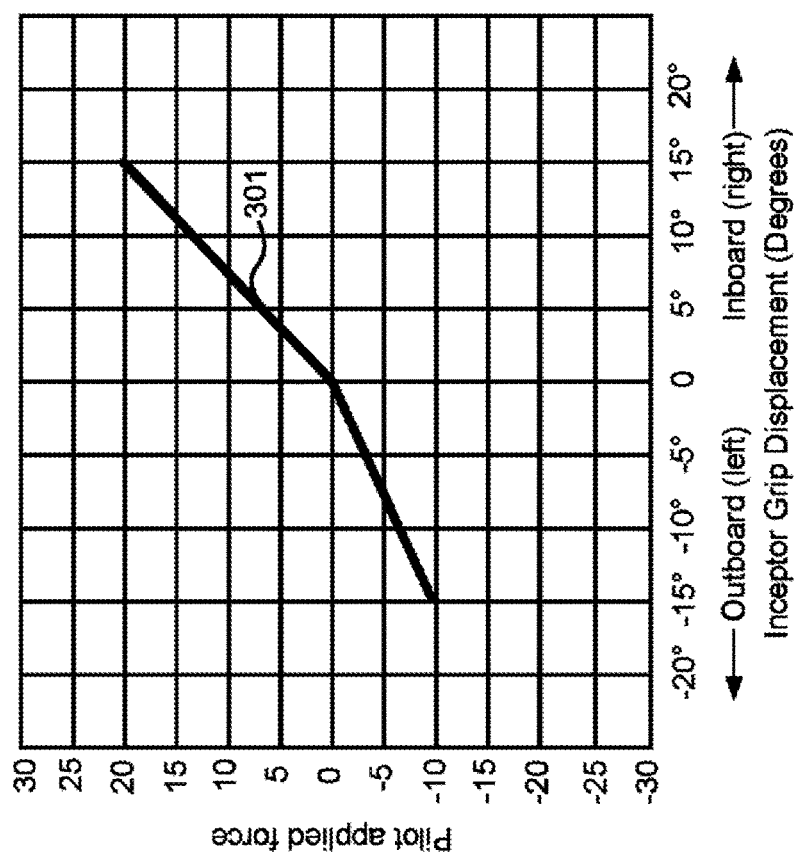

An example of asymmetric roll axis gradients is illustrated in FIG. 3 where graph 301 shows a force-displacement characteristic for the pilot's (left hand inceptor) and graph 302 shows a force-displacement characteristic for the co-pilot's (right hand inceptor). For the pilot, operating an inceptor with the left hand, to achieve an angular displacement of 15 degrees in an outboard (leftward) direction, the force required is only (−) 10 pounds but for the same displacement in the inboard (rightward) direction, the force required is (+) 20 pounds. For the co-pilot, operating an inceptor with the right hand, to achieve an angular displacement of 15 degrees in an inboard (leftward) direction, the force required is (−) 20 pounds but for the same displacement in the outboard (rightward) direction, the force required is only (+) 10pounds. So in this example, there is a gain factor ratio of 2 between inboard and outboard movements but other values are possible. The gain factor ratio is chosen to be the same for the pilot's inceptor as for the co-pilot's inceptor and may be set by the flying control system 101 and determined from pilot/co-pilot evaluations.

Figure 4:
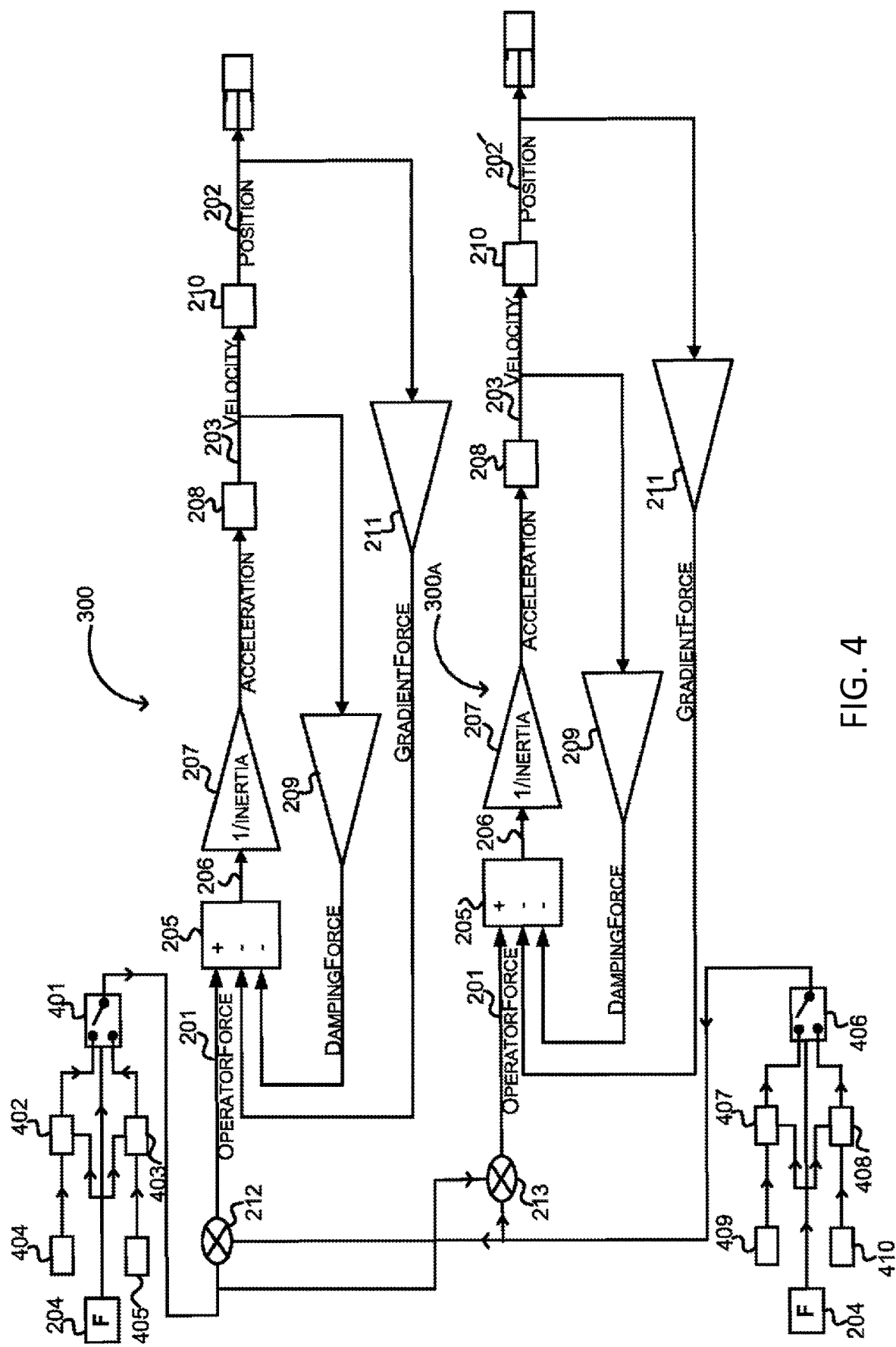
FIG. 4 is a schematic block diagram of a second example of first and second control systems for controlling operation of a pilot-operated inceptor and a co-pilot operated inceptor respectively.

FIG. 4 is a simplified block diagram illustrating components of two control systems 300, 300A which can maintain linking between pilot and co-pilot inputs to their respective inceptors while at the same time, provide different inboard/outboard feedback forces. FIG. 4 shows the linked pilot and co-pilot control systems 200 and 200A of FIG. 2 with the following additional components and functionality.

Each gradient force gain circuit 211 of control systems 300, 300A is configured with the same force position mapping characteristic. Each control system 300, 300A can provide asymmetric roll axis gradients with the gradient for inboard movements being greater than that for outboard movements. In this example, the ratio of gradients is 2:1 as in the example described above with reference to FIG. 3. In one example, each control system 300, 300A is provided with a calculating circuit (not shown) for calculating a ratio of gradients based on null (zero) position to first co-ordinate segment of the left and right transmitted force-displacement characteristic. In another example, the flying control circuit transmits a fixed ratio to each control system 300, 300A. The force-displacement mapping characteristic in each gradient force gain circuit 211 is set at the higher gradient in both directions. So in this example the force-displacement mapping characteristic requires that an angular displacement of plus or minus 15° requires an applied force of 20 pounds.

A first switching circuit 401 receives inputs from box 204 (the signal representing the sensed force applied by the pilot to his inceptor) and from two multiplier circuits 402, 403 respectively. The first switching circuit 401 is configured to detect whether the force applied by the pilot to his inceptor is positive or negative. In this example, convention is that a positive force is a rightward movement of the inceptor (that is, inboard for the pilot) and a negative force is a leftward movement of the inceptor (that is, outboard for the pilot). Depending on whether the force applied is positive or negative, the first switching circuit selects an output signal from either one of the multiplier circuits 402, 403 and outputs the selected signal to the summers 212 and 213 for further processing by the second order MSD control systems as described above with reference to FIG. 2. The multiplier circuits 402, 403 receive the sensed force (from box 204) and also from respective gain circuits 404, 405 and therefore modify the value of the signal representing the sensed force. In this example, a first gain circuit 404 provides a gain factor equal to 1 and a second gain circuit 405 provides a gain factor greater than 1 (2 in this example, but other values are possible). In operation, when the first switching circuit 401 detects that the pilot's inceptor has been moved to the right (inboard), it selects the output of multiplier 402 which has applied a gain factor of 1 to the force signal received from box 204. When the first switching circuit 401 detects that the pilot's interceptor has been moved to the left (outboard), it selects the output of multiplier 403 which has applied a gain factor greater than 1 (2 in this example) to the force signal received from box 204. Hence, when the pilot moves the inceptor to the left a greater force signal is output for summing by the first summer 205 than when the pilot moves the inceptor to the right.

The co-pilot's control system 300A is provided with a similar arrangement. A second switching circuit 406 receives inputs from box 204 (the signal representing a sensed force applied by the co-pilot to his inceptor) and from two multiplier circuits 407, 408 respectively. The second switching circuit 406 is configured to detect whether the force applied by the co-pilot to his inceptor is positive or negative. A positive force is a rightward movement of the inceptor (that is, outboard for the co-pilot) and a negative force is a leftward movement of the inceptor (that is, inboard for the co-pilot). Depending on whether the force applied is positive or negative, the second switching circuit 406 selects an output signal from either one of the multiplier circuits 407, 408 and outputs the selected signal to the summers 213 and 212 for further processing. The multiplier circuits 407, 408 receive the sensed force (from box 204) and also from respective gain circuits 409, 410 and therefore modify the value of the signal representing the sensed force. In this example, a third gain circuit 409 provides a gain factor greater than 1 (2 in this example) and a fourth gain circuit 410 provides a gain factor equal to 1. In operation, when the second switching circuit 406 detects that the co-pilot's inceptor has been moved to the right (outboard), it selects the output of multiplier 407 which has applied a gain factor of 2 to the sensed force signal received from box 204. When the second switching circuit 406 detects that the co-pilot's interceptor has been moved to the left (inboard), it selects the output of multiplier 408 which has applied a gain factor equal to 1 to the sensed force signal. Hence, when the co-pilot moves the inceptor to the right a greater force signal is output for summing by the first summer 205 than when the co-pilot moves the inceptor to the left.

The gain factors (provided by the gain circuits 404, 405, 409, 410) represent a multiplying factor applied to the sensed force to produce a 'factored' force before transmission (over a digital link, for example) to the other inceptor and for use within the own inceptor's MSD model. Hence the total force input used in the pilot's second order MSD model is the sum of the factored force signal which is output by the first switching circuit 401 and a factored force signal received from the co-pilot's inceptor (that is from the output of the second switching circuit 406). Similarly the total force input used in the co-pilot's second order MSD model is the sum of the factored force which is output by the second switching circuit 406 and a factored force signal received from the pilot's inceptor (that is from the output of the first switching circuit 401).

By employing the arrangement of FIG. 4, both the pilot's and co-pilot's inceptors receive the same total force contribution and provided that the force-displacement mapping characteristic is identical across both inceptors, they will link in position whilst providing an asymmetric force-gradient feel to the pilot and co-pilot. Optimally, the force-displacement mapping characteristics in the negative (leftward) direction of the pilot and the co-pilot inceptors are identical. Likewise, the force-displacement characteristics in the positive (rightward) direction of the pilot and co-pilot inceptors are also identical. However, the positive and negative force-displacement characteristics can be different.

The example of FIG. 4 provided assistance to the operator when moving in an outboard board direction by providing a gain factor greater than one when movement in this direction was detected. In an alternative arrangement, movements in an inboard direction can be made more difficult by providing a gain factor of less than one when movement in this direction is detected. In this latter case, a gain factor equal to 1 is applied to movements in the outboard direction.

Although the specific examples have been described with reference to control sticks for aircraft, it will be understood that the principles disclosed herein may be equally applicable to other type of vehicles and machinery.

The signal processing functionality of the embodiments of the invention may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional unit.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A control system for controlling manually-operated first and second control sticks, the control system comprising:
    a first circuit arrangement for receiving force signals representative of a force applied to each of the first and second control sticks resulting from a side to side movement of the first and second control sticks and arranged to detect if said force applied is in an inward direction towards the operator or an outward direction away from the operator and to apply a gain factor to each received force signal to produce factored force signals wherein the gain factor applied to a received force signal representative of a force applied in an outward direction is greater than the gain factor applied to a received force signal representative of a force applied in an inward direction; and
    a second circuit arranged to sum the factored force signals to produce a modified force signal for use in first and second force feedback control systems associated, respectively, with the first and second control sticks,
    the first and second force feedback control systems arranged to receive the modified force signal, each of the first and second force feedback control systems configured as a second order Mass Spring Damper (MSD) system.

2. The control system of claim 1 wherein the gain factor applied to a received force signal representative of a force applied in an outward direction is greater than 1 and the gain factor applied to a received force signal representative of a force applied in an inward direction is equal to 1.

3. The control system of claim 1 wherein the gain factor applied to a received force signal representative of a force applied in an outward direction is equal to 1 and the gain factor applied to a received force signal representative of a force applied in an inward direction is less than 1.

4. The control system of claim 1 wherein a ratio of the gain factor applied to a received force signal representative of a force applied to the first control stick in an outward direction to the gain factor applied to a received force signal representative of a force applied to the first control stick in an inward direction has the same value as a ratio of the gain factor applied to a received force signal representative of a force applied to the second control stick in an outward direction to the gain factor applied to a received for signal representative of a force applied to the second control stick in an inward direction.

5. The control system of claim 1 wherein the second order Mass Spring Damper (MSD) system includes, respectively, first and second gradient force gain circuits having independent mappings of force-displacement characteristics.

6. An inceptor system for an aircraft including first and second control sticks linked electronically and the control system of claim 1.

7. An aircraft including the inceptor system of claim 6.

8. A method for controlling manually-operated first and second control sticks, the method comprising:
    receiving force signals representative of a force applied to each of the first and second control sticks resulting from a side to side movement of the first and second control sticks;
    detecting if said force applied is in an inward direction towards the operator or an outward direction away from the operator;
    applying a gain factor to each received force signal to produce factored force signals wherein the gain factor applied to a received force signal representative of a force applied in an outward direction is greater than the gain factor applied to a received force signal representative of a force applied in an inward direction; and
    summing the factored force signals to produce a modified force signal for use in first and second force feedback control systems associated, respectively, with the first and second control sticks,
    the first and second force feedback control systems arranged to receive the modified force signal, each of the first and second force feedback control systems configured as a second order Mass Spring Damper (MSD) system.

9. The method of claim 8 wherein the gain factor applied to a received force signal representative of a force applied in an outward direction is greater than 1 and the gain factor applied to a received force signal representative of a force applied in an inward direction is equal to 1.

10. The method of claim 8 wherein the gain factor applied to a received force signal representative of a force applied in an outward direction is equal to 1 and the gain factor applied to a received force signal representative of a force applied in an inward direction is less than 1.

11. The method of claim 8 wherein a ratio of the gain factor applied to a received force signal representative of a force applied to the first control stick in an outward direction to the gain factor applied to a received force signal representative of a force applied to the first control stick in an inward direction has the same value as a ratio of the gain factor applied to a received force signal representative of a force applied to the second control stick in an outward direction to the gain factor applied to a received for signal representative of a force applied to the second control stick in an inward direction.

12. A computer program product including one or more non-transitory computer readable mediums having instructions encoded thereon that when executed by one or more processors cause a process to be carried out for controlling a manually-operated control stick and for enabling the control stick to settle to a trim position when zero force is applied to the control stick by an operator, the process comprising:
receiving force signals representative of a force applied to each control stick resulting from a side to side movement of a control stick;
detecting if said force applied is in an inward direction towards the operator or an outward direction away from the operator;
applying a gain factor to each received force signal to produce factored force signals wherein the gain factor applied to a received force signal representative of a force applied in an outward direction is greater than the gain factor applied to a received force signal representative of a force applied in an inward direction; and
summing the factored force signals to produce a modified force signal for use in a force feedback control system associated with each control stick.

13. The computer program product of claim 12 wherein the one or more non-transitory computer readable mediums include at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

14. The computer program product of claim 12 wherein the gain factor applied to a received force signal representative of a force applied in an outward direction is greater than 1 and the gain factor applied to a received force signal representative of a force applied in an inward direction is equal to 1.

15. The computer program product of claim 12 wherein the gain factor applied to a received force signal representative of a force applied in an outward direction is equal to 1 and the gain factor applied to a received force signal representative of a force applied in an inward direction is less than 1.

16. The computer program product of claim 12 wherein a ratio of the gain factor applied to a received force signal representative of a force applied to the first stick in an outward direction to the gain factor applied to a received force signal representative of a force applied to the first stick in an inward direction has the same value as a ratio of the gain factor applied to a received force signal representative of a force applied to the second stick in an outward direction to the gain factor applied to a received for signal representative of a force applied to the second stick in an inward direction.

17. The computer program product of claim 12 including first and second force feedback control systems associated, respectively, with the first and second control sticks and arranged to receive the modified force signal and wherein each of said first and second force feedback control systems is configured as a second order Mass Spring Damper (MSD) system including, respectively, first and second gradient force gain circuits containing independent mappings of force-displacement characteristics.

18. An inceptor system for an aircraft including first and second control sticks linked electronically and the computer program product of claim 12.

19. An aircraft including the inceptor system of claim 18.

20. An aircraft including the computer program product of claim 12.

* * * * *